United States Patent [19]
Vacek

[11] 3,893,014
[45] July 1, 1975

[54] SYSTEM FOR SUBSTANTIALLY ELIMINATING THE FUNDAMENTAL AND HARMONICS OF A RIPPLE VOLTAGE OR CURRENT

[75] Inventor: Jan Vacek, Bonndorf, Germany

[73] Assignee: International Standard Electric Corporation, New York, N.Y.

[22] Filed: May 20, 1974

[21] Appl. No.: 471,249

[30] Foreign Application Priority Data
May 23, 1973 Germany............................ 2326239

[52] U.S. Cl...................... 321/9 R; 307/58; 307/76; 307/84; 324/161; 321/27; 318/231
[51] Int. Cl.² ......................................... H02M 1/12
[58] Field of Search ........ 321/9 R, 10, 27; 310/111, 310/112; 324/163, 165, 161, 173; 317/5; 307/45, 47, 57, 58, 72–76, 82, 89; 318/231

[56] References Cited
UNITED STATES PATENTS

| | | | |
|---|---|---|---|
| 3,253,218 | 5/1966 | Mayer................................ | 324/173 |
| 3,500,190 | 3/1970 | Michon.............................. | 324/161 |
| 3,614,616 | 10/1971 | Bucer et al. ........................ | 317/5 X |
| 3,769,570 | 10/1973 | Stairs ................................. | 321/9 R |
| 3,792,286 | 2/1974 | Meier.................................. | 307/58 |

*Primary Examiner*—Gerald Goldberg
*Attorney, Agent, or Firm*—A. Donald Stolzy

[57] ABSTRACT

A first tachometer generator or other alternator having at least two phases and at least two poles, wherein the output of the first tachometer generator is full wave rectified. A second tachometer generator is also provided having one phase and at least four poles. The output of the second tachometer generator is full wave rectified to provide a periodic wave to match to the fundamental ripple frequency at the output of the first tachometer generator rectifiers and/or to eliminate the fundamental. An outstanding feature of the disclosure is that ripple elimination is achieved independent of generator speed. This is especially desirable in a vast number of controls including, but not limited to, speed controls for electric or other motors. The reason that this is desirable is that the ripple fundamental can be a very low frequency at low speeds and cannot be easily or inexpensively removed by filters. If not removed, the ripple can have a serious adverse effect upon the dynamic response and accuracy of the system in which a tachometer generator is used.

7 Claims, 3 Drawing Figures

3,893,014

SYSTEM FOR SUBSTANTIALLY ELIMINATING THE FUNDAMENTAL AND HARMONICS OF A RIPPLE VOLTAGE OR CURRENT

BACKGROUND OF THE INVENTION

Under the provisions of Title 35, U.S. Code, Section 119, claim is hereby made for priority based upon the first filing of this application, Ser. No. P 23 26 239.7 filed May 23, 1973, in Germany.

This invention relates to electrical equipment, and more particularly, to apparatus for eliminating the ripple content of a varying D.C. voltage and/or current.

The present application also relates to an arrangement for generating a speed-dependent D.C. voltage. Such arrangements are required, for example, for the speed control of electric motors in which case the control voltage is used as the speed analog in the control.

It is well known that a speed-dependent D.C. control voltage can be derived from a tachometer generator whose rotating part is coupled with a machine rotor, the speed of which is to be controlled. It is also well known that the output voltage, frequency and amplitude of a tachometer generator are speed dependent, and that its output is rectified. The rectification of this output voltage, like the rectification of any A.C. voltage, results not only in the desired D.C. voltage, but also in an A.C. voltage, called the ripple, which is imposed on that D.C. voltage. It is known that the ripple can be smoothed by means of LC or RC filters, but complete smoothing is not possible and good smoothing only at a considerable cost, particularly at low speeds.

The presence of the ripple in the rectified D.C. output voltage of a tachometer generator has a disadvantage in that the superimposed, rather high ripple voltage acts as a spurious signal on the control loop and may falsify the control. Any LC or RC filters have the disadvantage of introducing a time constant into the control loop. This time constant is most disturbing, especially at low speeds, and places a limit on the use of known arrangements with filters for speed control.

SUMMARY OF THE INVENTION

In accordance with the device of the present invention, the above-described and other disadvantages of the prior art are overcome by avoiding the use of capacitors and inductors, and correcting or eliminating ripple simply by the use of a full wave rectified sine wave.

In one embodiment of the present invention, one of two tachometer generators has a two-phase stator winding and a two-pole permanent magnet rotor, while the other has a single-phase stator and a four-pole permanent magnet rotor. The rotors are rigidly coupled together and the stator windings fixed relative to each other in positions such that the maximum values of the voltages induced in the two generators are reached at the same instant in time.

The above-described and other advantages of the present invention will be better understood from the following detailed description when considered in connection with the accompanying drawings.

BRIEF DESCRIPTION OF THE DRAWINGS

In the drawings which are to be regarded as merely illustrative.

DESCRIPTION OF THE PREFERRED EMBODIMENT

Figure 1:
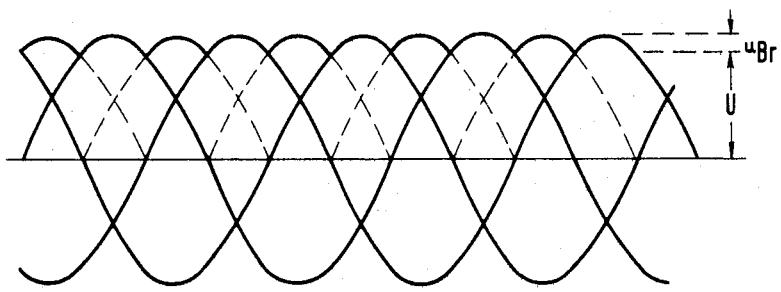
FIG. 1 is a graph of a group of waveforms illustrating the formation of a ripple voltage in a three-phase A.C. voltage generator with rectified output voltages.

In FIG. 1, the output voltage of an A.C. voltage tachometer generator is shown having a three-phase stator winding and a two-pole permanent magnet rotor after full wave rectification. A D.C. voltage U is obtained on which the A.C. voltage $u_{Br}$ is superimposed. Even if filtered, the superimposed A.C. voltage $u_{Br}$ is rather high. This results in the disadvantages mentioned hereinbefore.

Figure 2:
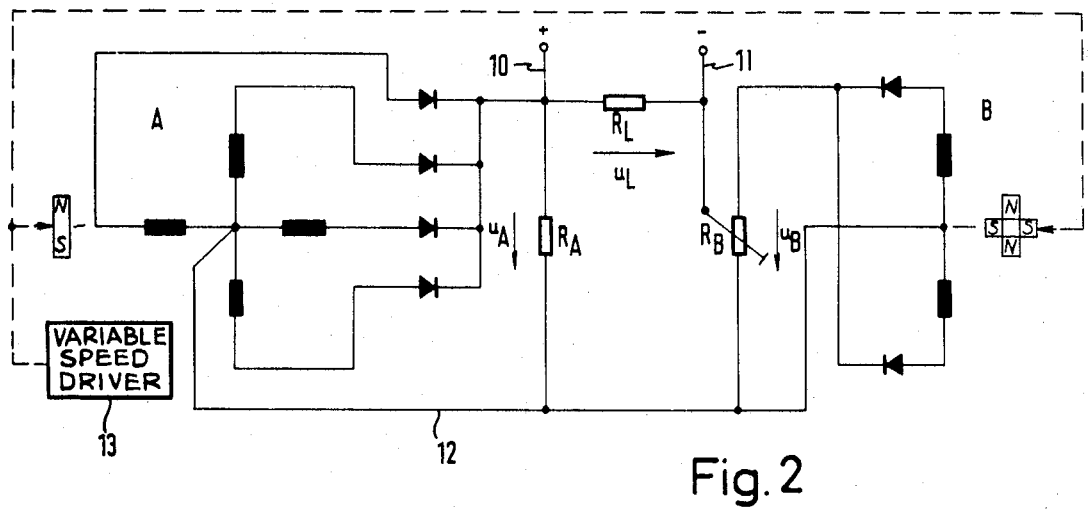
FIG. 2 is a schematic diagram of one embodiment of the present invention.

An embodiment of the present invention for generating a D.C. control voltage is shown in FIG. 2. It consists of an A.C. voltage generator A having a two-phase stator winding and a two-pole permanent magnet rotor. An A.C. voltage generator B is also shown in FIG. 2 having a single-phase stator winding and a four-pole permanent magnet rotor. The A.C. output voltage of the generator A acts, via full wave rectifiers, on a load resistor $R_A$, across which a voltage $u_A$ drops. The A.C. output voltage of the generator B acts, via a full wave rectifier, on a variable load resistor $R_B$, across which a voltage $u_B$ drops. The permanent magnet rotors of the generators A and B are rigidly coupled to the rotor of a motor whose speed is to be controlled. A resistor $R_L$ is connected between a tap (wiper) of a resistor $R_B$ (potentiometer) and the upper terminal of the resistor $R_A$. The voltage dropping across $R_L$ is $u_L = u_A - u_B$.

Figure 3:
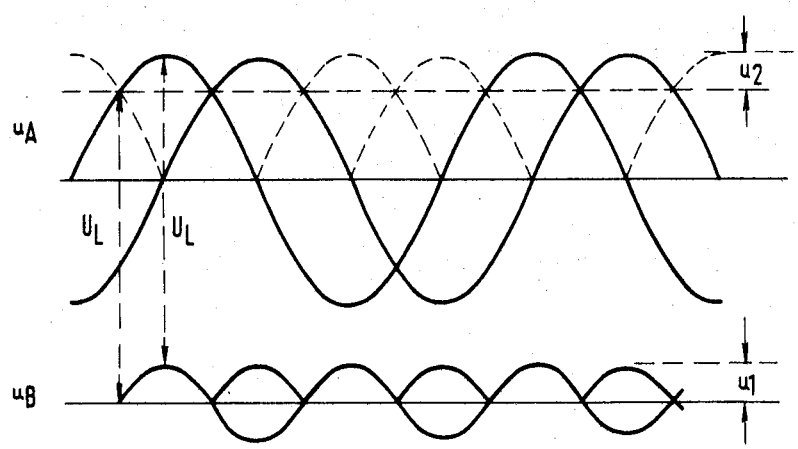
FIG. 3 is another graph of a group of waveforms illustrating how the output voltages of generators shown in FIG. 2 together eliminate ripple.

In FIG. 3, the waveforms of the rectified A.C. voltages $u_A$ and $u_B$ are drawn one over another to permit a comparison. By the choice of suitable A.C. voltage generators and the properly adjusted phase angle between the rotors of the generators A and B it is insured that the A.C. voltage components of the voltages $u_A$ and $u_B$ are in frequency and phase synchronism. If, at the resistor $R_B$, the amplitude of the voltage $u_B$ is adjusted so that $u_1 = u_2$, then $U_L = U_L$ as shown in FIG. 3, i.e. a genuine D.C. voltage will be obtained which can be used as a speed-dependent control D.C. voltage without any noticeable ripple or ripple fundamental or second or higher harmonics.

Arrangements operating on the principle shown in FIG. 3 may also differ from the generators A and B of FIG. 2. If the single-phase stator winding is retained in the generator B, all A.C. generators with a v-phase stator winding and a w-pole permanent magnet rotor can be used for the generator A provided that the number of poles of the permanent magnet rotor of the generator B is $v \cdot w$. The phase angle between the like permanent magnet poles of the rotors of the generators A and B must be so adjusted that the maximum values of the voltages $u_A$ and $u_B$ are in phase. Instead of the rotating A.C. voltage generator B, an electronic A.C. voltage generator may be used whose frequency is controlled electronically depending on the speed. In any case, a D.C. control voltage substantially without ripple and a time constant can be generated with the novel arrangement.

One outstanding advantage of the present invention lies in the fact that the control range of the motors equipped with such tachometer generators is widened in that fast and accurate control is made possible at substantially low speeds.

One outstanding and unexpected advantage of the present invention resides in the fact that the fundamental in the full wave rectified output of the single-phase machine always has a phase and frequency synchronous with the fundamental in the full wave rectified output of the polyphase machine because both rotors are rigidly fixed to the same shaft and are, therefore, turned synchronously. This means that ripple cancellation is achieved independent of the speed of the rotors.

Another outstanding and unexpected advantage of the present invention resides in the fact that substantially perfect ripple cancellation is achieved. The reason for this is that even though the pulse train above the horizontal dotted line in FIG. 3 is not a full wave rectified sine wave, the Fourier series of this pulse train bears an incredible resemblence to the Fourier series of a full wave rectified sine wave.

As will be noted, the embodiment of FIG. 2 has a positive output lead 10, a negative output lead 11 and a common lead 12 connecting all the windings of both machines.

The resistors $R_A$, $R_L$ and $R_B$ may be optional in some cases. Assuming they are removed, and the rectifier cathodes of the single-phase machine are connected to the negative output lead 11, the open circuit voltage appearing between leads 10 and 12 in FIG. 2 will have a magnitude approximately or exactly equal to $f_a(x)$, where $f_a(x)$ is defined by the Fourier series:

$$f_a(x) = A_{a0} + A_{a1} \cos x$$
$$+ A_{a2} \cos 2x$$
$$+ A_{a3} \cos 3x$$
$$\vdots$$
$$A_{an} \cos nx \tag{1}$$

and, $x$ is $2\pi ft$, (2)

$\pi$ is 3.1416, (3)

$f$ is the variable or constant fundamental frequency, (4)

$t$ is time, (5)

$$A_{a0} = \frac{E_a \sin \phi}{(\phi)(1 - \cos \phi)} \tag{6}$$

$E_a$ is a constant which may be equal to $u_2$, (7)

$$\phi = \frac{\pi}{(2)(m+1)} \text{ in radians,} \tag{8}$$

$m$ is any positive integer. The term $(m+1)$ is equal to the number of phases of the polyphase machine.

$$A_{a1} = \frac{2E_a \phi \sin \phi}{(1 - \cos \phi)(\pi^2 - \phi^2)} \tag{10}$$

$$A_{a2} = \frac{2E_a \phi \sin \phi}{(1 - \cos \phi)(4\pi^2 - \phi^2)} \tag{11}$$

$$A_{a3} = \frac{2E_a \phi \sin \phi}{(1 - \cos \phi)(9\pi^2 - \phi^2)} \tag{12}$$

$$\vdots$$

$$A_{an} = \frac{(-1)^{n+1}(2E_a \phi \sin \phi)}{(1 - \cos \phi)(\pi^2 n^2 - \phi^2)} \tag{13}$$

The open circuit voltage appearing between leads 11 and 12 in FIG. 2 with all the resistors omitted and the cathodes of the single-phase machine connected to lead 11, will have a magnitude approximately or exactly equal to $f_b(x)$, where $f_b(x)$ is defined by the Fourier series:

$$f_b(x) = A_{b0} + A_{b1} \cos x$$
$$+ A_{b2} \cos 2x + A_{b3} \cos 3x$$
$$\vdots$$
$$A_{bn} \cos nx \tag{14}$$

and $$A_{b0} = \frac{E_b}{\pi} \tag{15}$$

$$A_{b1} = \frac{4E_b}{3\pi} \tag{16}$$

$$A_{b2} = \frac{-4E_b}{15\pi} \tag{17}$$

$$A_{b3} = \frac{4E_b}{35\pi} \tag{18}$$

$$\vdots$$

$$A_{bn} = \frac{(4E_b)(-1)^{n+1}}{(\pi)(4n^2 - 1)} \tag{19}$$

and $E_b$ is a constant which may be equal to $u_1$, $n$ being a number identifying the selfsame $n^{th}$ harmonic of each of said series.

Common 12 connects both machines in a manner to produce an output signal, i.e. an output voltage or output current between leads 10 and 11 approximately or exactly and directly proportional to the difference $\mu$, where $$\mu = Df_a(x) + Ef_b(x) \tag{20}$$

where,

D is a constant, (21)

E is a constant, (22)

the constants D and E always having opposite algebraic signs.

The said one constant may be unity, the other of said constants being −1.

As will be explained, the following condition may or may not apply:

$$E_b \cong E_a \qquad (23)$$

The following condition also may or may not apply:

$$E_b \cong \frac{2\pi E_a \, \phi \sin \phi}{(2)(1 - \cos \phi)(\pi^2 - \phi^2)} \qquad (24)$$

This will also be explained hereinafter.

The polyphase machine may have $2^p$ poles. The polyphase machine disclosed herein has that many poles where:

$$p = 1 \qquad (25)$$

Equations (23) and (24) may be explained as follows.

Equation (24) can be derived by setting $$A_{a1} = A_{b1} \qquad (26)$$

This eliminates the fundamental in $f_a(x)$.

In the embodiment of FIG. 2, $$m = 1 \qquad (27)$$

Thus, $$\phi = \frac{\pi}{4}$$

Using equation (28), equation (24) may be reduced to $$E_b = \left[\frac{2E_a}{5}\right]\left[1 + \sqrt{2}\right] \qquad (29)$$

The following is true:

$$\left[\frac{2}{5}\right]\left[1 + \sqrt{2}\right] = 0.9656 \qquad (30)$$

Thus, $$E_b = 0.9656 \, E_a \qquad (31)$$

Just as predicted, $$E_b \cong E_a \qquad (32)$$

See equation (23). To completely cancel the ripple fundamental, equation (32) is accurate to within 3.44 percent.

Let us still assume $$m = 1 \qquad (33)$$

and let us assume that we accurately cancel all of the ripple fundamental. How much ripple is left in the second harmonic and what is its magnitude as a percent of the average or D.C. voltage remaining after subtracting $f_b(x)$?

The remaining average or D.C. voltage is $A_{ao} - A_{bo}$.

$$A_{ao} - A_{bo} = \frac{E_a \sin \phi}{(\phi)(1 - \cos \phi)} - \frac{2E_b}{\pi} \qquad (34)$$

Using equations (11), (17), (28), (29) and (34), $$A_{ao} - A_{bo} = \left[\frac{16 E_a}{5\pi}\right]\left[1 + \sqrt{2}\right] \qquad (35)$$

$$A_{a2} = -\left[\frac{8 E_a}{63\pi}\right]\left[1 + \sqrt{2}\right] \qquad (36)$$

$$A_{b2} = -\left[\frac{8 E_a}{75\pi}\right]\left[1 + \sqrt{2}\right] \qquad (37)$$

$$\frac{-A_{a2} + A_{b2}}{A_{ao} - A_{bo}} = \frac{\frac{8E_a}{63\pi} - \frac{8E_a}{75\pi}}{\frac{16E_a}{5\pi}} \qquad (38)$$

$$= \frac{\frac{8}{63} - \frac{8}{75}}{\frac{16}{5}} \qquad (39)$$

$$= \frac{2}{315} \qquad (40)$$

A second harmonic of sixty-three hundredths of one percent! Independent of rotor speed! Below one percent with a good margin to spare.

A variable speed driver 13 is shown in FIG. 2 which may or may not be a conventional electric motor, the speed of which is controlled by a conventional servo, not shown, in accordance with the amplitude of the voltage which appears between leads 10 and 11.

From equations (24) and (34), $$A_{ao} - A_{bo} = \frac{(E_a)(\pi^2 - 4\phi^2)(\sin \phi)}{(\phi)(\pi^2 - \phi^2)(1 - \cos \phi)} \qquad (42)$$

and $$\frac{E_a}{A_{ao} - A_{bo}} = \frac{(\phi)(\pi^2 - \phi^2)(1 - \cos \phi)}{(\pi^2 - 4\phi^2)(\sin \phi)} \qquad (43)$$

Note from (43) that all harmonics approach zero when $\phi$ approaches zero because when $\phi$ approaches zero, $E_a$ approaches zero. $A_{ao} - A_{bo}$ approaches the peak amplitude as $\phi$ approaches zero.

If $$\left|\frac{dA_{an}}{dn}\right| = A'_{an} \quad (44)$$

and $$\left|\frac{dA_{bn}}{dn}\right| = A'_{bn} \quad (45)$$

the difference between the amplitudes of the harmonics in the two series of the same frequency becomes a maximum at $$A'_{an} = A'_{bn} \quad (46)$$

From equations (13), (19) and (24), $$A_{an} = \frac{(-1)^{n+1} 2E_a \phi \sin \phi}{(1 - \cos \phi)(\pi^2 n^2 - \phi^2)} \quad (47)$$

$$A_{bn} = \frac{(-1)^{n+1} 6E_a \phi \sin \phi}{(1 - \cos \phi)(\pi^2 - \phi^2)(4n^2 - 1)} \quad (48)$$

$$A'_{an} = \frac{(2E_a \phi \sin \phi)(2\pi^2 n)}{(1 - \cos \phi)(\pi^2 n^2 - \phi^2)^2} \quad (49)$$

$$A'_{bn} = \frac{(2E_a \phi \sin \phi)(24n)}{(\pi^2 - \phi^2)(4n^2 - 1)^2(1 \cos \phi)} \quad (50)$$

$$\frac{2\pi^2 n}{(\pi^2 n^2 - \phi^2)^2} = \frac{24n}{(\pi^2 - \phi^2)(4n^2 - 1)^2} \quad (51)$$

$$n = \sqrt{1 + \frac{\sqrt{3\pi^2 - 3\phi^2}}{2\pi}} \quad (52)$$

The minimum value of $\phi$ is zero. The maximum value of $\phi$ is $\pi/4$. Between these limits, $n$ of (52) is always less than 2.0. Hence, the maximum difference between the harmonics of $f_a(x)$ and the respective harmonics of $f_b(x)$ always occurs at the second harmonic and the difference between the amplitudes of each succeeding pair of harmonics of the same frequency is always less than that of the immediately preceding lower frequency pair.

$E_a$, $E_b$ and $f$ may be equal to $K_1Z$, $K_2Z$ and $K_3Z$, respectively, where $K_1$, $K_2$ and $K_3$ are constants. The term $Z$ may be motor speed or the angular velocity of the rotors in FIG. 2, if desired, or may be the same or some other common dependent or independent variable, or a common constant.

The following patents are hereby listed as prior art hereto. However, all of these patents disclose ripple reduction equipments which are more complicated, and more expensive than the present invention and, they are also less effective than the present invention in that they do not reduce the ripple fundamental and harmonics to insignificant amplitudes as the present invention does.

In the foregoing, $p$ is any positive integer.

What is claimed is:

1. An arrangement for generating a speed-dependent D.C. voltage without substantial ripple, said arrangement comprising: a first voltage generator for producing an A.C. output voltage; first rectifier means connected with said first generator to rectify the said A.C. output voltage thereof; a second generator coupled to said first generator for producing an A.C. output voltage in frequency and phase synchronism with that of said first generator; second rectifier means connected with said second generator to rectify the A.C. output voltage thereof; and a pair of output leads, said first and second rectifier means and said first and second generators being connected together and to said output leads in a manner such that said generators and said rectifier means are connected in a series circuit that substantially reduces the ripple appearing at the output of said first rectifier means, the said A.C. voltage generators being rotatable, one of which has a two-phase stator winding and a two-pole permanent magnet rotor, while the other has a single-phase stator winding and a four-pole permanent magnet rotor, said rotors being rigidly coupled together in such a manner that the maximum values of said first and second generator output voltages are in phase.

2. A D.C. generator comprising: first means for producing a first periodic signal having a magnitude approximately equal to $f_a(x)$, where $f_a(x)$ is defined by the Fourier series $$f_a(x) = A_{ao} + A_{a1} \cos x$$
$$+ A_{a2} \cos 2x$$
$$+ A_{a3} \cos 3x$$

$$A_{an} \cos nx$$

and, $x$ is $2\pi ft$, $\pi$ is 3.1416, $f$ is the variable or constant fundamental frequency, $t$ is time, $$A_{ao} = \frac{E_a \sin \phi}{(\phi)(1 - \cos \phi)}$$

$E_a$ is a constant, $$\phi = \frac{\pi}{(2)(m+1)} \text{ in radians,}$$

$m$ is any positive integer, $$A_{a1} = \frac{2E_a \phi \sin \phi}{(1 - \cos \phi)(\pi^2 - \phi^2)}$$

$$A_{a2} = \frac{-2E_a \phi \sin \phi}{(1 - \cos \phi)(4\pi^2 - \phi^2)}$$

$$A_{a3} = \frac{2E_a \phi \sin \phi}{(1 - \cos \phi)(9\pi^2 - \phi^2)}$$

$$A_{an} = \frac{(-1)^{n+1}(2E_a \phi \sin \phi)}{(1 - \cos \phi)(\pi^2 n^2 - \phi^2)};$$

and second means for producing a second periodic signal having a magnitude approximately equal to $f_b(x)$, where $f_b(x)$ is defined by the Fourier series $$f_b(x) = A_{bo} + A_{b1} \cos x + A_{b2} \cos 2x + A_{b3} \cos 3x$$

$$\vdots$$

$$A_{bn} \cos nx$$

and, $$A_{bo} = \frac{2E_b}{\pi}$$

$$A_{b1} = \frac{4E_b}{3\pi}$$

$$A_{b2} = \frac{-4E_b}{15\pi}$$

$$A_{b3} = \frac{4E_b}{35\pi}$$

$$\vdots$$

$$A_{bn} = \frac{(4E_b)(-1)^{n+1}}{(\pi)(4n^2-1)}$$

$E_b$ is a constant, $n$ being a number identifying the self-same $n^{th}$ harmonic of each of said series; and third means connecting said first means and said second means in a manner to produce an output signal approximately proportional to the difference $\mu$, where $$\mu = Df_a(x) + Ef_b(x),$$

where,
D is a constant,
E is a constant,
the constants D and E always having opposite algebraic signs, $E_a$, $E_b$ and $f$ all being equal to $K_1 Z$, $K_2 Z$ and $K_3 Z$, respectively, $K_1$, $K_2$ and $K_3$ being constants, Z being a common dependent or independent variable, or a common constant.

3. The invention as defined in claim 2, wherein said one constant is unity, the other of said constants being $-1$.

4. The invention as defined in claim 3, wherein $E_b$ is defined by $$E_b \cong E_a.$$

5. The invention as defined in claim 3, wherein $E_b$ is defined by $$E_b \cong \frac{3\pi E_a \phi \sin \phi}{(2)(1-\cos \phi)(\pi^2 - \phi^2)}$$

6. The invention as defined in claim 5, wherein said first and second means include first and second tachometer generators, respectively, having first and second sets of output windings, respectively, a common lead connecting all of said windings, first and second output leads, and first and second full wave rectifier means connected from said first and second winding sets, respectively, to said first and second output leads, respectively, said first tachometer generator being a polyphase machine, said second tachometer generator being a single-phase machine, the product of the number of poles and phases of said first tachometer generator being equal to the number of poles of said second tachometer generator, said first tachometer generator having a number of poles $2^p$, where $p$ is any positive integer, $(m+1)$ being equal to the number of phases of said first tachometer generator, Z being the speed of said first and second tachometer generators.

7. The invention as defined in claim 2, wherein said first and second means may be varied, and fourth means associated with said first and second means to vary the said fundamental frequency $f$ in the A.C. components of both of said series.

* * * * *